United States Patent
Wilson et al.

(10) Patent No.: US 9,061,755 B2
(45) Date of Patent: Jun. 23, 2015

(54) AIRCRAFT WING ASSEMBLY

(71) Applicant: AIRBUS OPERATIONS LIMITED, Bristol (GB)

(72) Inventors: James Wilson, Winscombe (GB); Paul Hadley, Weston-Super-Mare (GB); John Gleave, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 169 days.

(21) Appl. No.: 13/714,666

(22) Filed: Dec. 14, 2012

(65) Prior Publication Data

US 2013/0153712 A1 Jun. 20, 2013

(30) Foreign Application Priority Data

Dec. 14, 2011 (GB) .................................. 1121435.0

(51) Int. Cl.
 *B64C 9/24* (2006.01)
 *B64C 9/22* (2006.01)
 *B64F 5/00* (2006.01)

(52) U.S. Cl.
 CPC ............. *B64C 9/24* (2013.01); *Y10T 29/49815* (2015.01); *B64C 9/22* (2013.01); *B64F 5/0081* (2013.01); *Y02T 50/32* (2013.01)

(58) Field of Classification Search
 CPC ...... B64C 2009/143; B64C 9/24; B64C 9/22; B64F 5/0045; B64F 5/0081
 USPC ............... 244/34 R, 35 R, 198, 201, 213, 214
 See application file for complete search history.

(56) References Cited

U.S. PATENT DOCUMENTS 4,687,162 A * 8/1987 Johnson et al. ................ 244/213
4,880,189 A * 11/1989 Day .............................. 244/214

(Continued)

FOREIGN PATENT DOCUMENTS

EP  0397438 A2  11/1990
EP  2149495 A1  2/2010

(Continued)

OTHER PUBLICATIONS

Search Report corresponding to GB 1121435.0, dated Apr. 25, 2012.
Search Report corresponding to GB 1121435.0, dated Jun. 20, 2012.

*Primary Examiner* — Tien Dinh
*Assistant Examiner* — Christopher Hutchens
(74) *Attorney, Agent, or Firm* — Lowe Hauptman & Ham, LLP (57) ABSTRACT

An aircraft wing assembly, comprising a wing having a fixed leading edge, a slat mounted upon a slat deployment mechanism for moving the slat between a retracted position and an extended position with respect to the fixed leading edge, the fixed leading edge having an aperture to accommodate the slat deployment mechanism, and a closing plate mounted off the slat deployment mechanism for closing a gap between a lower trailing edge of the slat and a lower edge of the aperture when the slat is retracted. The closing plate can include a first portion and a second portion, and a hinge connecting the first and the second portions. The closing plate can include a plurality of integrally formed spacer elements for positioning the closing plate with respect to the slat deployment mechanism. Also, a method of removing an access panel in an aircraft wing assembly.

21 Claims, 5 Drawing Sheets

(56) References Cited

U.S. PATENT DOCUMENTS

| | | |
|---|---|---|
| 5,044,580 A | 9/1991 | Williams |
| 7,051,982 B1 * | 5/2006 | Johnson ........................ 244/215 |
| 2008/0121758 A1 * | 5/2008 | Hernandez ................... 244/130 |
| 2012/0286101 A1 | 11/2012 | Hirai et al. |

FOREIGN PATENT DOCUMENTS

| | | |
|---|---|---|
| GB | 2137569 A | 10/1984 |
| GB | 2204538 A | 11/1988 |

* cited by examiner

AIRCRAFT WING ASSEMBLY

RELATED APPLICATIONS

The present application is based on, and claims priority from, British Application Number 1121435.0, filed Dec. 14, 2011, the disclosure of which is hereby incorporated by reference herein in its entirety.

FIELD OF INVENTION

The present invention relates to an aircraft wing assembly.

BACKGROUND OF INVENTION

An aircraft may be equipped with high-lift devices, such as slats on a fixed leading edge of a wing and flaps on a fixed trailing edge of the wing. The high-lift devices are typically deployed during take-off and/or landing phases of a flight in order to increase the lift coefficient of the wing during relatively low speed flight. The slats and flaps are mounted from the wing for movement between a retracted and one or more extended (deployed) positions.

A slat deployment mechanism for supporting and controlling the slat generally comprises two or more support tracks driven by rollers mounted within the wing. The slat tracks are typically coupled to the slat by a so called "knuckle", and each slat track/knuckle is accommodated by an aperture in the fixed leading edge panels (upper "D nose" panel and lower cover panel). The slat tracks are operable to move the slat between the retracted and the one or more extended positions.

A closing plate is typically mounted to the underside of the slat track immediately behind the knuckle, such that on retraction of the slat the plate closes a gap between a lower trailing edge of the slat and a lower edge of the aperture in the fixed leading edge.

In some legacy aircraft wing designs, such as described in GB2204538A, the closing plate is a rigid metallic plate. However, a relatively large clearance gap is required around the closing plate to avoid contact with the surrounding structure, which reduces aerodynamic efficiency.

More recently, it has been proposed to arrange the closing plate such that a periphery of the plate overlaps an area of the surrounding structure (the outer surfaces of the slat and the fixed leading edge) when the slat is retracted. The overlap provides some improvement in aerodynamic efficiency. Setting the closing plate to the desired offset to avoid contact with the surrounding structure, so as to avoid fretting, can be time consuming. This can be particularly problematic if the closing plate overlaps with an access panel as the closing plate may need to be removed and accurately re-set each time the access panel is removed and replaced. Alternatively, the overlapping closing plate can be moved out of the way of the access panel by deploying the slat, but this entails procedures to ensure the slats are not retracted whilst the maintenance is underway.

SUMMARY OF THE INVENTION

In a first aspect the present invention provides an aircraft wing assembly, comprising a wing having a fixed leading edge, a slat mounted upon a slat deployment mechanism for moving the slat between a retracted position and an extended position with respect to the fixed leading edge, the fixed leading edge having an aperture to accommodate the slat deployment mechanism, and a closing plate mounted off the slat deployment mechanism for closing a gap between a lower trailing edge of the slat and a lower edge of the aperture when the slat is retracted, wherein the closing plate includes a first portion and a second portion, and a hinge connecting the first and the second portions.

In a second aspect the invention provides a method of removing an access panel in an aircraft wing assembly, the wing assembly comprising a wing having a fixed leading edge, a slat mounted upon a slat deployment mechanism for moving the slat between a retracted position and an extended position with respect to the fixed leading edge, the fixed leading edge having an aperture to accommodate the slat deployment mechanism, and a closing plate mounted off the slat deployment mechanism for closing a gap between a lower trailing edge of the slat and a lower edge of the aperture when the slat is retracted, wherein the fixed leading edge includes a removable access panel adjacent the aperture, and a portion of the closing plate overlaps the access panel when the slat is retracted; and, with the slat retracted performing the steps of:

releasing the overlapping portion of the closing plate from the slat deployment mechanism;

rotating the normally overlapping portion of the closing plate about a hinge formed in the closing plate, whilst the remainder of the closing plate remains attached to the slat deployment mechanism; and removing the access panel once the closing plate is hinged clear of the access panel.

The first and second aspects of the invention are advantageous in that one portion of the closing plate can be moved about the hinge, such that the closing plate can be moved out of the way to gain access to an adjacent structure without requiring removal of the closing plate from the slat deployment mechanism.

In a third aspect the present invention provides an aircraft wing assembly, comprising a wing having a fixed leading edge, a slat mounted upon a slat deployment mechanism for moving the slat between a retracted position and an extended position with respect to the fixed leading edge, the fixed leading edge having an aperture to accommodate the slat deployment mechanism, and a closing plate mounted off the slat deployment mechanism for closing a gap between a lower trailing edge of the slat and a lower edge of the aperture when the slat is retracted, wherein the closing plate includes a plurality of integrally formed spacer elements for positioning the closing plate with respect to the slat deployment mechanism.

The third aspect of the invention is advantageous in that the integral spacer elements reduce parts count and reduce the risk of parts being lost during maintenance.

The hinge may be a mechanical hinge or a strip of increased flexibility within the closing plate construction. The hinge may extend across the width of the closing plate so as to extend along one edge of the first portion and one edge of the second portion.

The fixed leading edge may include a removable access panel adjacent the aperture, and a portion of the closing plate overlaps the access panel when the slat is retracted.

The normally overlapping portion of the closing plate is arranged to be rotated about the hinge to permit removal/installation of the access panel. The provision of a hinge permits access for maintenance, without removal of the closing plate. The closing plate needs to be positioned on the wing with tight tolerances. Since the closing plate is not removed from the aircraft this alleviates the problem of repositioning the closing plate within tolerance.

The aircraft wing assembly may further comprise a plurality of spacer elements for positioning the closing plate with respect to the slat deployment mechanism. Each spacer element may be a component that spaces the closing plate from other components of the wing so as to minimise a gap between the closing plate and an outer surface of the wing.

The spacer elements may be integrally formed with the closing plate. The provision of a plurality of integral spacer elements means that when access is required for maintenance, for example to remove, for example, an interchangeable lower leading panel that may form part of the aerodynamic surface of the fixed leading edge, the spacer elements remain attached to the plate. This means a reduced parts count, and in particular a reduced free loose parts count which reduces the risk of parts being lost during maintenance.

The spacer elements may be deformable compression pads. This permits the closing plate to be adjusted and/or to permit the closing plate to deflect into alignment with the contours of the wing. For example, the spacer elements may be rubber or silicone compression pads. The deformable compression pads allow the closing plate to flex so as to improve the conformity of the closing plate to the aerodynamic surfaces and minimise the gap between the aerodynamic surfaces of the fixed leading edge and the slat and the closing plate.

The closing plate may be mounted off the slat deployment mechanism by a plurality of fasteners, and at least some of the plurality of fasteners are quick release fasteners.

The closing plate may include four spacer elements. Two of the spacer elements may be configured to receive two fixed fasteners and two of the other spacer elements may be configured to receive two quick release fasteners for mounting the closing plate to the slat deployment mechanism.

Advantageously the two fixed fasteners hold the closing plate in position whilst the quick release fasteners can be released so as to provide maintenance access. The two spacer elements configured to receive a quick release fastener may also be permitted to maintain the fastener in connection with the spacer when the fastener is released from the slat deployment mechanism.

The closing plate may include an elastomeric material, preferably silicone. The integral spacer elements may be formed with the elastomer, for example by a curing or moulding process.

The closing plate may be sufficiently flexible to seal against the slat and/or the fixed leading edge when the slat is retracted. Provision of a flexible closing plate is advantageous because it allows the closing plate to conform to the contours of the aerodynamic surfaces, which results in a reduction in drag and therefore an increase in aerodynamic efficiency.

The conventional titanium (or other metallic) closing plate is designed to be inherently inflexible, because if such a plate were permitted to flex the gap between the closing plate and the leading edge would need to be increased to avoid an increase in fretting; increasing the gap would increase drag and therefore reduce aerodynamic efficiency.

The closing plate may include one or more rigid inserts. The insert(s) may be moulded within the elastomeric material. The insert helps to ensure structural integrity of the closing plate. The insert is preferably a plate. The insert may be composite or metallic.

The closing plate may include a layer resistant to environmental conditions. The coating resistant to environmental conditions may be an outer layer of the closing plate. For example, the coating resistant to environmental conditions may be polyurethane. Resistance to environmental conditions will be understood in the art as those conditions that would cause erosion of the closing plate, and a person skilled in the art will appreciate the appropriate materials to use to resist such erosion.

The closing plate may have a coating of low surface friction. The low friction coating may be on an inner surface of the closing plate. The low friction coating may be positioned around a peripheral edge of the closing plate in an area of the closing plate that seals against the outer aerodynamic surfaces of the fixed leading edge and the slat. For example, the low friction coating may be a polyester coating. The person skilled in the art will understand the types of materials that will have a sufficiently low surface friction to be used as an inner coating of the closing plate. In some embodiments the closing plate may comprise a composite insert having a polyester inner coating and a polyurethane outer layer.

Also, an aircraft comprising an aircraft wing assembly according to the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
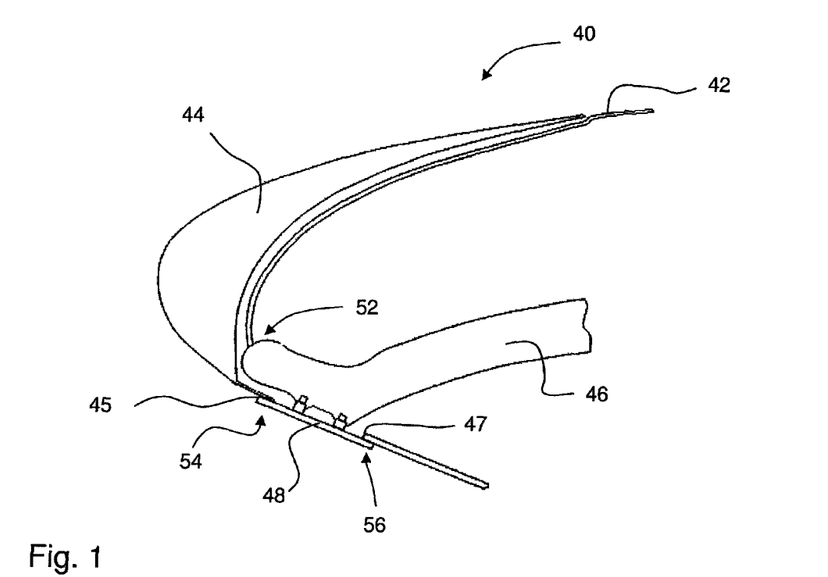
FIG. 1 shows a schematic side view of an aircraft wing assembly with a slat in its retracted position and a closing plate between a lower trailing edge of the slat and a lower edge of an aperture in the wing fixed leading edge.
Figure 2:
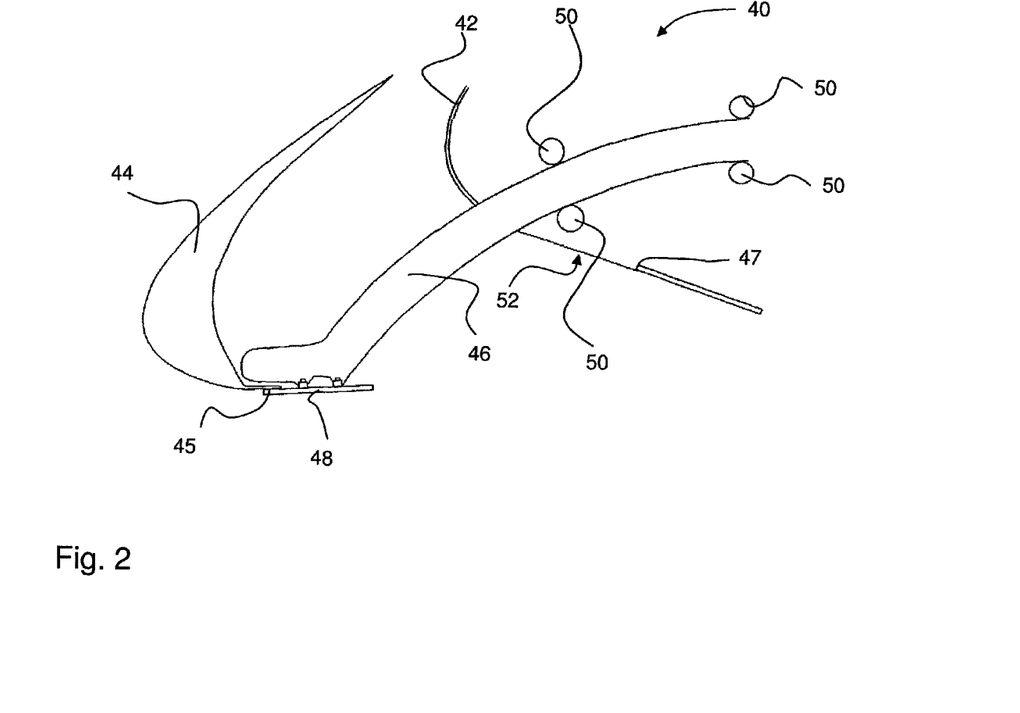
FIG. 2 shows the wing of FIG. 1 with the slat in its fully extended position.

An aircraft wing assembly is indicated generally at 40 in FIGS. 1 and 2. The wing assembly 40 comprising a wing with a fixed leading edge 42 and a slat 44 mounted upon a slat deployment mechanism, which in this embodiment includes an arcuate track 46 which is slidably mounted with respect to the leading edge 42 on a series of rollers 50. The slat track 46 is accommodated by an aperture 52 in the fixed leading edge 42. The track 46 is slidable between a stowed (retracted) cruise position (shown in FIG. 1) and a fully deployed (extended) landing position (shown in FIG. 2).

A closing plate 48 is mounted on a forward extremity of the track 46 and bridges the gap between a lower trailing edge 45 of the slat 44 and a lower edge 47 of the aperture 52, and extends to overlap an area 54, 56 of the aerodynamic surfaces of the slat 44 and of the fixed leading edge 42.

Figure 3:
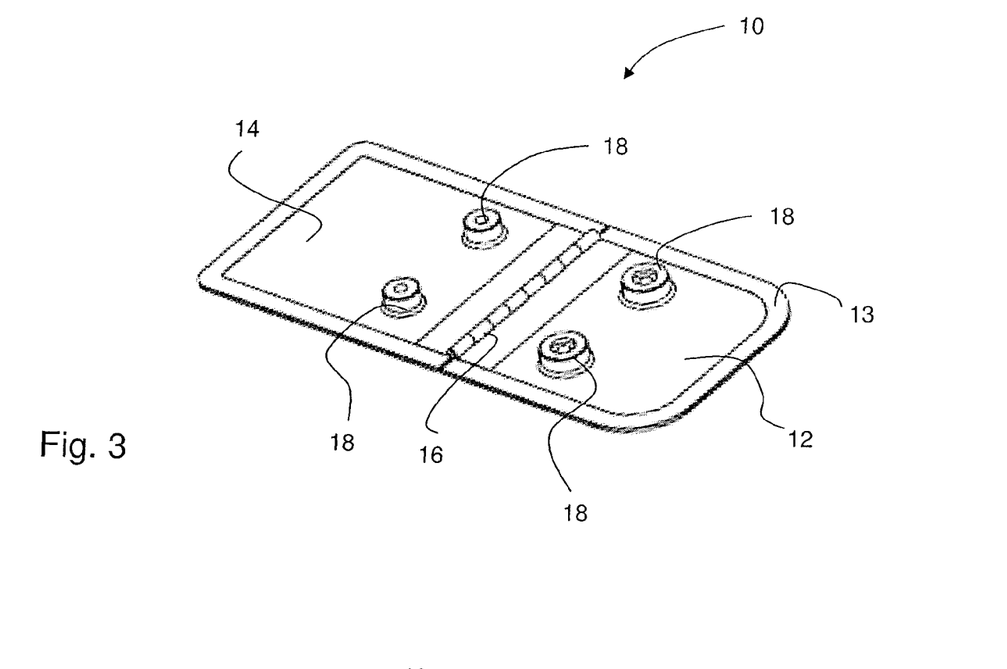
FIG. 3 shows a perspective view of an embodiment of the closing plate.
Figure 4:
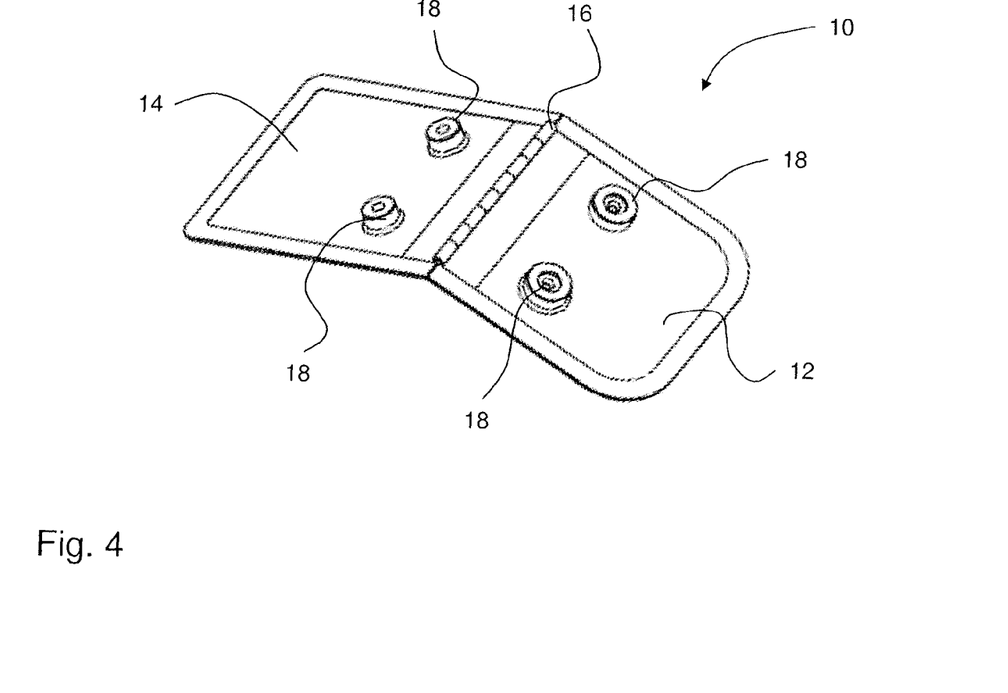
FIG. 4 shows a perspective view of the closing plate of FIG. 3 bent about its hinge.

The closing plate in accordance with a first embodiment will now be described in detail and is indicated generally at 10 in FIGS. 3 and 4.

The closing plate 10 is generally of rectangular shape, having a first portion 12 and second portion 14. A hinge 16 connects the first portion 12 to the second portion 14, and is positioned approximately centrally along the length of the closing plate 10 and extends across the majority of the width of the closing plate 10 leaving only a rim 13 of the first and second portions not in contact with the hinge 16. In use, the rim 13 overlaps the area 54, 56 of the aerodynamic surfaces of the slat 44 and the fixed leading edge 42. Four spacer elements 18 are integrally formed with the closing plate and protrude from an inner side of the closing plate 10.

Figure 5:
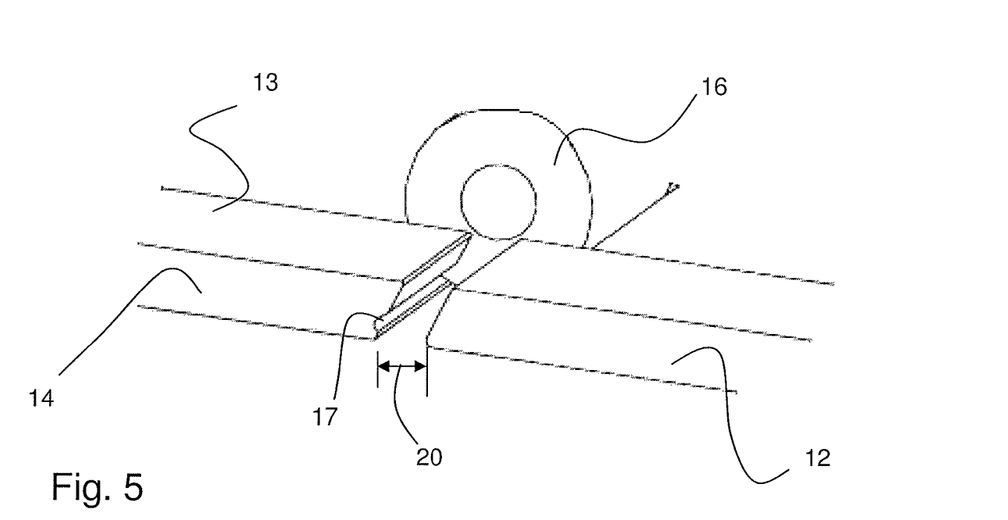
FIG. 5 shows a detailed view of the hinge of the closing plate of FIG. 3.
Figure 6:
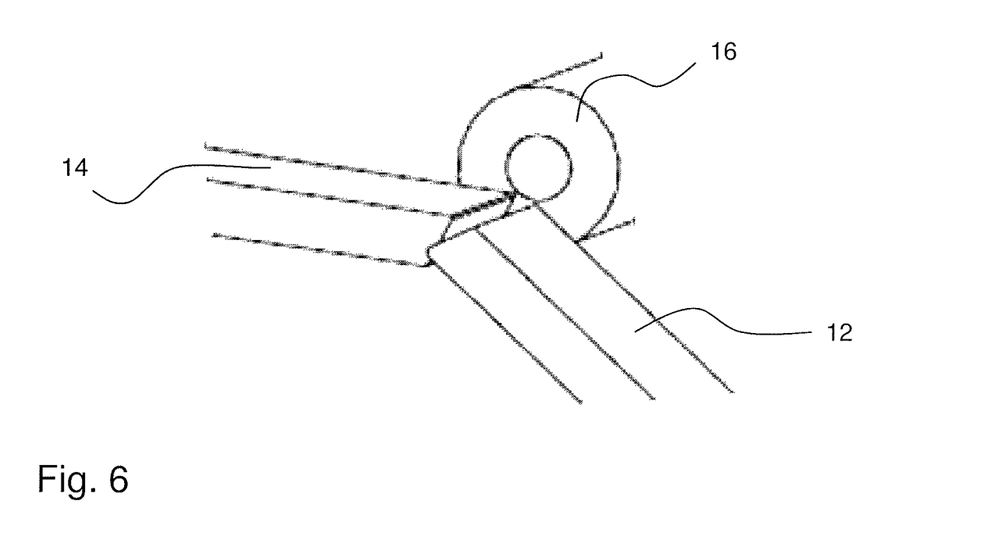
FIG. 6 shows a detailed view of the hinge of the closing plate of FIG. 4.

Referring to FIGS. 5 and 6, the first portion 12 and second portion 14 of the closing plate 10 are spaced apart by a gap 20 positioned about the positioning of the hinge 16. The opposing faces of the first portion 12 and the second portion 14 are inclined, so as to allow the closing plate 10 to flex. A recess 17 is formed in the opposing face of the second portion 14 to accommodate the rim of the first portion 12 when the first portion 12 is in a deflected position (as shown in FIG. 4).

In this embodiment, the closing plate 10 includes a composite insert. In alternative embodiments the closing plate may be formed from a polyester insert re-enforced with glass ply, the glass ply providing the required stiffness.

The composite insert is surrounded by a silicone substrate. In this embodiment, the four spacers are deformable compression pads made from silicone, and cured with the silicone substrate such that the spacers 18 are integrally formed with the silicone substrate. In alternative embodiments, a rubber material may be used instead of the silicone and the spacers 18 may also be made from rubber and be integrally moulded with the rubber.

A coating of a polyester fabric is applied to the silicone on the inner side of the closing plate (i.e. the side from which the spacers protrude) around the edge of the closing plate, i.e. in the region of rim 13.

A polyurethane layer is applied to the outer side of the closing plate 10 (i.e. the side of the closing plate not having spacers protruding therefrom). The above described composition of the closing plate 10 enables the closing plate 10 to be formed as a one-piece component. However, in alternative embodiments different materials and coatings may be combined to form a one-piece component.

Figure 7:
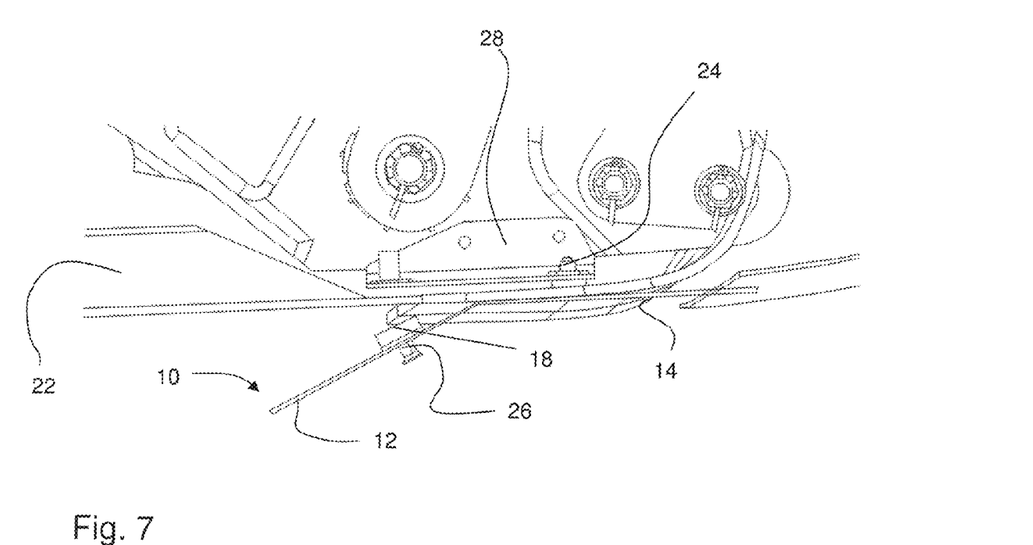
FIG. 7 shows a partially cut-away view of the underside of the wing assembly with the closing plate hinged downwardly.

Referring to FIG. 7, the connection of the closing plate 10 to the slat deployment mechanism will now be described in more detail. The closing plate 10 is positioned adjacent to interchangeable access panel 22 that forms part of the aerodynamic surface of the fixed leading edge 42. The closing plate 10 is connected to the slat deployment mechanism via two brackets 28 that are connected to the track that moves with the slat between a deployed position (during landing and/or take-off) and a retracted position (during cruise flight and when grounded). The flexibility of the closing plate 10 means that the closing plate 10 conforms to the surface of the wing and closes all or at least most of the gap between the slat and the leading edge of the wing.

The closing plate 10 is fixed to the brackets 28 with two fixed fasteners 24 and two quick release fasteners 26. The fasteners may be, for example, screws. One fixed fastener 24 and one quick release fastener 26 is received in each bracket, and each fastener 24, 26 is also received through the closing plate 10 and the respective integrally formed spacer 18. The fixed fasteners 24 are configured such that they are not removable from the wing during regular maintenance work. The quick release fasteners are configured such that when maintenance work is required the quick release fasteners 26 can be easily removed to allow the second portion 14 of the closing plate 10 to deflect downwards away from the slat deployment mechanism so as to allow access and maintenance to components within the region immediately behind the fixed leading edge. The spacers 18 configured to receive the quick release fasteners are also configured to maintain the fastener in contact with the spacer when it has been released from the bracket, so as to reduce the risk of fasteners being lost or misplaced. The hinge is configured such that the closing plate 10 has a relaxed release angle of approximately 25° so as to achieve a 45 mm clearance at initial opening.

Advantageously, when access to the interchangeable panel 22 is required for maintenance, the quick release fasteners 26 can be removed, and the hinge of the closing plate then permits the first section 12 to deflect/relax away from the slat deployment mechanism and the panel 22 can be removed. Once the required maintenance has been performed the panel 22 is reinstated and the quick release fasteners 26 can be replaced. The time taken to release and fasten the quick release fasteners 26 is much less than the time taken to attach a conventional closing plate back on to the aircraft wing assembly, therefore reducing the time required for regular maintenance work.

Furthermore, the configuration of the panel means that the closing plate is not removed from the aircraft during maintenance and this avoids the problem of repositioning the closing plate within tolerance. The plate configuration also reduces the free loose part count, which reduces the risk of components being lost or misplaced during maintenance.

A further advantage of the described embodiment(s) is that the flexible materials combined with the deformable compression pads of the closing plate allow the closing plate to flex so as to minimise the gap between the aerodynamic surfaces of the slat and fixed leading edge and the closing plate, and so as to conform to the aerodynamic surfaces. This flexing and conformity improves the aerodynamic efficiency of the aircraft. In some embodiments the aerodynamic efficiency can be further reduced by modifying the shape of the closing plate so as to reduce the step drag condition.

Figure 8:
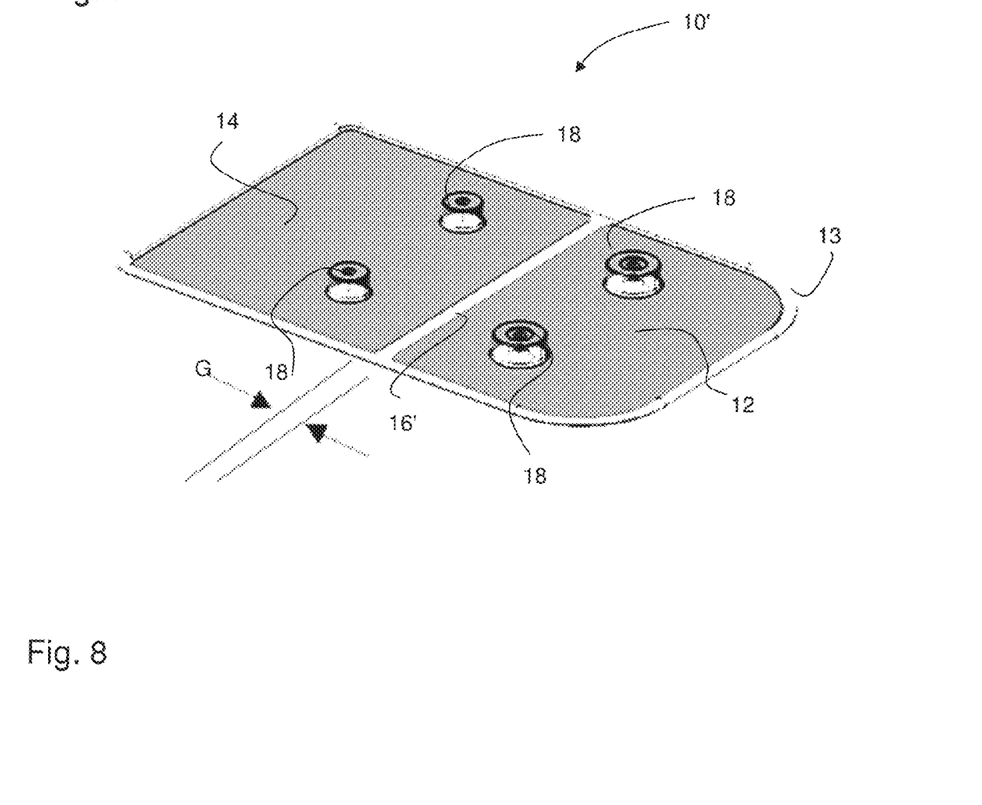
FIG. 8 shows a second embodiment of the closing plate.

The closing plate in accordance with a second embodiment will now be described with reference to FIG. 8. The closing plate 10' is similar to the closing plate 10 of the first embodiment with the exception that the mechanical hinge 16 has been omitted and replaced by a flexible material hinge 16'. The material hinge 16' includes the elastomeric substrate with a gap G between the composite (or other) inserts. The gap 20 in the rim 13 is omitted as unnecessary in the closing plate 10'. The closing plate 10' flexes about the hinge 16'. In all other respects the closing plate is identical to the closing plate 10 and so a repetition of its construction will not be repeated.

Figure 9:
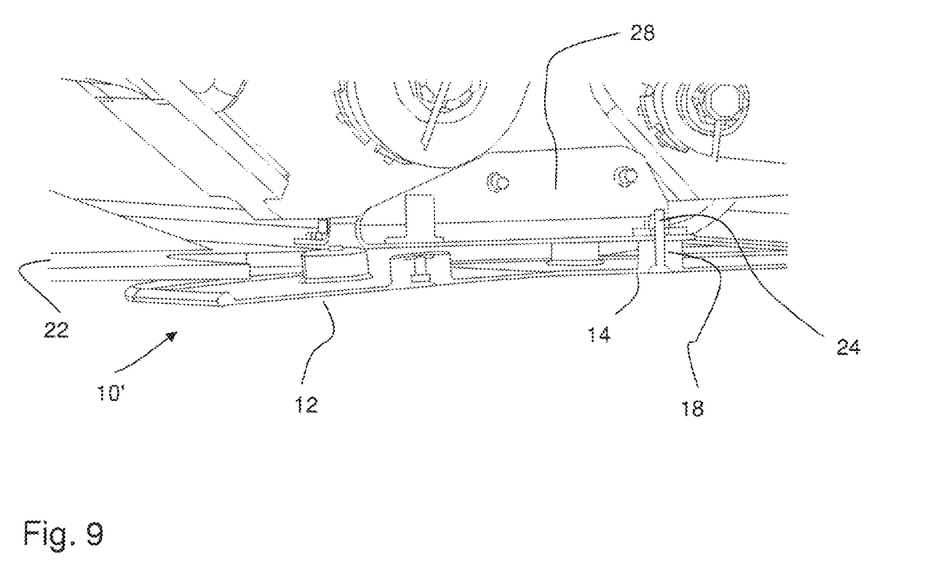
FIG. 9 shows a partially cut-away section view of the underside of the wing assembly with the closing plate of FIG. 8 hinged downwardly.

FIG. 9 shows the closing plate 10' on the wing assembly in its downwardly deflected position. Note that the closing plate 10' will tend to flex less when released as compared with the rotation about the mechanical hinge in the closing plate 10 shown in FIG. 7. The flexibility of the closing plate 10' enables easy deflection by hand to move the closing plate out of the way for access to panel 22.

Although the invention has been described above with reference to one or more preferred embodiments, it will be appreciated that various changes or modifications may be made without departing from the scope of the invention as defined in the appended claims. For example, alternative materials may be used to form the plate.

The invention claimed is:

1. An aircraft wing assembly, comprising a wing having a fixed leading edge, a slat mounted upon a slat deployment mechanism for moving the slat between a retracted position and an extended position with respect to the fixed leading edge, the fixed leading edge having an aperture to accommodate the slat deployment mechanism, and a closing plate mounted off the slat deployment mechanism for closing a gap between a lower trailing edge of the slat and a lower edge of the aperture when the slat is retracted, wherein the closing plate includes a first portion and a second portion, and further comprising a hinge pivotally connecting the first and the second portions.

2. An aircraft wing assembly according to claim 1, wherein the hinge is a mechanical hinge or a strip of increased flexibility within the closing plate construction.

3. An aircraft wing assembly according to claim 1, wherein the fixed leading edge includes a removable access panel adjacent the aperture, and a portion of the closing plate overlaps the access panel when the slat is retracted.

4. An aircraft wing assembly according to claim 1, further comprising a plurality of spacer elements for positioning the closing plate with respect to the slat deployment mechanism.

5. An aircraft wing assembly according to claim 1, wherein the closing plate is mounted off the slat deployment mechanism by a plurality of fasteners, and at least some of the plurality of fasteners are quick release fasteners.

6. An aircraft wing assembly according to claim 1, wherein the closing plate includes an elastomeric material, preferably silicone.

7. An aircraft wing assembly according to claim 1, wherein the closing plate includes one or more rigid inserts.

8. An aircraft wing assembly according to claim 6, wherein the insert(s) is/are moulded within the elastomeric material.

9. An aircraft wing assembly according to claim 7, wherein the insert is a plate.

10. An aircraft wing assembly according to claim 1, wherein the closing plate comprises a layer resistant to environmental conditions.

11. An aircraft wing assembly according to claim 10, wherein the layer is provided on an outer surface of the closing plate.

12. An aircraft wing assembly according to claim 1, wherein the closing plate has a low surface friction coating.

13. An aircraft wing assembly according to claim 12, wherein the coating is provided on an inner surface of the closing plate.

14. An aircraft wing assembly according to claim 13, wherein the coating is provided around only a periphery of the inner surface.

15. An aircraft wing assembly according to claim 1, wherein the closing plate is sufficiently flexible to seal against the slat and/or the fixed leading edge when the slat is retracted.

16. An aircraft comprising an aircraft wing assembly according to claim 1.

17. A method of removing an access panel in an aircraft wing assembly, the wing assembly comprising a wing having a fixed leading edge, a slat mounted upon a slat deployment mechanism for moving the slat between a retracted position and an extended position with respect to the fixed leading edge, the fixed leading edge having an aperture to accommodate the slat deployment mechanism, and a closing plate mounted off the slat deployment mechanism for closing a gap between a lower trailing edge of the slat and a lower edge of the aperture when the slat is retracted, wherein the fixed leading edge includes a removable access panel adjacent the aperture, and a portion of the closing plate overlaps the access panel when the slat is retracted; and, with the slat retracted performing the steps of:

releasing the overlapping portion of the closing plate from the slat deployment mechanism;

rotating the normally overlapping portion of the closing plate about a hinge formed in the closing plate, whilst the remainder of the closing plate remains attached to the slat deployment mechanism; and removing the access panel once the closing plate is hinged clear of the access panel.

18. An aircraft wing assembly, comprising:

a wing having a fixed leading edge, a slat mounted upon a slat deployment mechanism for moving the slat between a retracted position and an extended position with respect to the fixed leading edge, the fixed leading edge having an aperture to accommodate the slat deployment mechanism, and a closing plate mounted off the slat deployment mechanism for closing a gap between a lower trailing edge of the slat and a lower edge of the aperture when the slat is retracted, wherein the closing plate includes a first portion and a second portion, and a hinge connecting the first and the second portions, wherein the normally overlapping portion of the closing plate is arranged to be rotated about the hinge to permit removal/installation of the access panel, and wherein the fixed leading edge includes a removable access panel adjacent the aperture, and a portion of the closing plate overlaps the access panel when the slat is retracted.

19. An aircraft wing assembly according to claim 4, wherein spacer elements are integrally formed with the closing plate.

20. An aircraft wing assembly according to claim 4, wherein the spacer elements are deformable compression pads.

21. An aircraft wing assembly according to claim 4, wherein the closing plate includes four spacer elements.

* * * * *